United States Patent [19]
Niemczura, Sr. et al.

[11] Patent Number: 6,145,626
[45] Date of Patent: Nov. 14, 2000

[54] AIR/OIL LUBRICATION SYSTEM AND METHOD FOR MONITORING AND CONTROLLING AIR/OIL LUBRICATION SYSTEMS

[75] Inventors: Raymond J. Niemczura, Sr., Mansfield; Carl A. Gedeon, Middleburg Hts; James R. Mismas, Concord Township; Jamy E. Bulan, Lakewood, all of Ohio

[73] Assignee: Lubriquip, Inc., Cleveland, Ohio

[21] Appl. No.: 09/326,774

[22] Filed: Jun. 4, 1999

[51] Int. Cl.$^7$ ................................ F16N 7/30; F16N 7/34
[52] U.S. Cl. ............................................................ 184/55.1
[58] Field of Search ..................... 184/55.1, 81; 384/468

[56] References Cited

U.S. PATENT DOCUMENTS

| | | | |
|---|---|---|---|
| 4,735,286 | 4/1988 | Miki et al. | 184/55.1 |
| 5,042,618 | 8/1991 | Switalski et al. | 184/55.1 |
| 5,806,630 | 9/1998 | Bernal | 184/55.1 |

*Primary Examiner*—Dirk Wright
*Attorney, Agent, or Firm*—Hill & Simpson

[57] ABSTRACT

A system for the delivery and control of an air/oil mixture used to lubricate large bearings in heavy duty applications such as steel mills is provided. The system includes a mixing module for mixing air and oil and delivering the air/oil mixture through a plurality of connecting lines to a plurality of bearing housings. Each of the connecting lines or the outlet leading to the connecting line is, in turn, connected to its own individual solenoid. Each solenoid is connected to a common pressure transducer which is connected to a controller. The controller sequentially opens the solenoids one at a time thereby establishing communication between one of the connecting lines and the common transducer at a time. The transducer receives pressure signals fr6m each connecting line converts the pressure signals to analog signals before transmitting the analog signals to the controller. The controller then compares the signal received from the transducer with predetermined acceptable high low pressure values to ensure that the line is either not broken or not clogged.

12 Claims, 7 Drawing Sheets

AIR/OIL LUBRICATION SYSTEM AND METHOD FOR MONITORING AND CONTROLLING AIR/OIL LUBRICATION SYSTEMS

FIELD OF THE INVENTION

The present invention relates generally to the lubrication of large or heavy-duty bearings used in industrial equipment. Still more specifically, the present invention relates to lubrication systems for supplying an air/oil mixture to large bearings used in industrial equipment and apparatuses, such as those found in steel mills. Further, the present invention relates to methods for monitoring and controlling lubrication systems that deliver an air/oil mixture to large bearings used in heavy duty applications.

BACKGROUND OF THE INVENTION

The concept of lubricating large bearings using an air/oil mixture is known. One currently-available system is sold by Lubriquip, Inc., a unit of IDEX Corporation, of Cleveland, Ohio. Currently-available lubrication systems for equipment with large bearings employs standard divider valves which meter the correct amounts of oil for delivery to a plurality of bearing points. The oil is delivered to a mixing tee where it is combined with a stream of compressed air using an aspiration process. The air/oil mixture is then conveyed to the bearing points through pipes or tubes. The discharge of the air/oil mixture from the mixing tee is monitored by means of pressure switches which are necessary to detect if a lubrication line is broken or blocked. Specifically, if the line is broken, the pressure in the line will be too low; if the line is blocked, the pressure in the line will be too high.

The problems associated with the currently-available design includes the necessity of the separate mixing tees for each bearing point and the plumbing associated with the mixing tees, including the large number of air connections that are required. Still further, the current design requires a high pressure switch and a low pressure switch for each bearing point, or each air/oil mixture outlet. The currently-available system also provides a limited amount of air flow which is disadvantageous because it has been found that a larger air flow to the bearing points would be beneficial because higher air flow capability enables contaminants to be removed from the bearing housings during lubrication.

Further, by employing pressure switches for fault monitoring, two switches for each bearing point must be employed—a high pressure switch and a low pressure switch. Each switch must be individually adjusted for either high or low pressure conditions. Thus, two switches per bearing point must be adjusted and maintained. Still further, the currently-available pressure switches are not as accurate as desired.

Accordingly, there is a need for an improved air/oil lubrication system for heavy duty bearings which is less costly to manufacture, to maintain and to monitor.

SUMMARY OF THE INVENTION

The present invention satisfies the aforenoted needs by providing an air/oil lubrication system for controllably delivering an air/oil mixture to a plurality of bearing points. The system of the present invention comprises a mixing module comprising an air inlet, an oil inlet and a plurality of air/oil mixture outlets. The air inlet and oil outlet being connected to each of the air/oil mixture outlets. Each air/oil mixture outlet is connected to one of a plurality of bearing points by one of a plurality of lubrication lines or other suitable conduit system. Each air/oil mixture outlet is connected to one of a plurality of solenoids. Each solenoid is connected to a common pressure transducer. The common pressure transducer is connected to a controller. The controller sequentially opens the solenoids, one at a time, thereby establishing communication between only one of the air/oil mixture outlets and the common transducer at a time. The common transducer receives a pressure signal from the air/oil mixture outlet that it is connected to by way of the solenoid and converts the pressure signal to an analog signal before transmitting the analog signal to the controller.

In an embodiment, the controller comprises a memory with a predetermined high pressure value and a predetermined low pressure value stored in the memory. The controller compares the analog signals received from the transducer with the high and low pressure values stored in the memory. The controller further comprises a high and low pressure warning indicia or an alarm system which is activated in the event the controller receives a signal from the transducer that falls outside of an acceptable pressure range defined by the high and low pressure values.

In an embodiment, the controller comprises a memory with a predetermined high pressure value and a predetermined low pressure value stored in the memory. The controller compares the signals received from the transducer for each air/oil mixture outlet with the high and low pressure values. The controller further comprises high and low pressure warning systems which are activated in the event the controller receives a signal from the transducer for any one of the air/oil mixture outlets that fall outside of an acceptable pressure range defined by the high and low pressure values. The high and low pressure warning system also identifies which of the air/oil mixture outlets is at a pressure outside of the acceptable pressure range.

In an embodiment, the mixing module further comprises a plurality of base sections arranged in a stacked configuration. Each base section comprises an air passageway in communication with the air inlet. Each base section further comprises an oil passageway in communication with the oil inlet and each base section further comprises an air/oil mixture passageway in communication with one of the air/oil mixture outlets. Further, each base section comprises an adjustable valve disposed between its air passageway and its air/oil mixture passageway for controlling the flow of air into its air/oil mixture passageway and, as a result, for controlling the pressure at its air/oil mixture outlet.

In an embodiment, the adjustable valves of each base section further comprise an adjustment screw with a head disposed on an exposed surface of the base section thereby enabling adjustment of the screw while the system is in operation.

In an embodiment, the controller further comprises a digital readout for indicating the pressure of the air/oil mixture outlet in communication with the transducer.

In an embodiment, the present invention provides a method for monitoring the pressure in an air/oil lubrication system which comprises the steps of supplying pressurized air to an air inlet, supplying pressurized oil to an oil inlet, mixing the air and oil in a plurality of base sections that each include an air/oil mixture outlet in communication with one of a plurality of bearing points, measuring a pressure at one of the air/oil mixture outlets with a common transducer and generating a measured pressure signal, comparing the measured pressure signal for said one of the air/oil mixture outlets with predetermined acceptable high and low pressure values, in the event the measured pressure value for the air/oil mixture outlet currently being measured exceeds the high pressure value or falls below the low pressure value, generating an alarm signal, and sequentially repeating the steps of measuring the pressure, comparing the measured pressure and generating an alarm signal, if necessary, for each air/oil mixture outlet.

In an embodiment, the step of generating an alarm signal of the method of the present invention further comprises the sub-step of identifying the air/oil mixture outlet where the measured pressure is above the high pressure value or below the low pressure value.

In an embodiment, the present invention further comprises a method for adjusting the pressure of an air/oil mixture being supplied to a plurality of bearing points of an air/oil lubrication system. The method comprises the steps of supplying pressurized air to an air inlet, supplying pressurized oil to an oil inlet, and mixing the air and oil in a plurality of base sections. Each base section comprises an air passageway in communication with the air inlet, an oil passageway in communication with the oil inlet and an air/oil mixture passageway in communication with an air/oil mixture outlet. Each base section further comprises an adjustable valve disposed between the air passageway and the air/oil mixture passageway of the base section for controlling the flow of air into the air/oil mixture passageway of the base section. The method further comprises the steps of measuring the pressure at one of the air/oil mixture outlets with a common transducer and generating a measured pressure signal, converting the measured pressure signal to a numerical value, displaying the numerical value, in the event the numerical value falls above a predetermined acceptable pressure range, adjusting the adjustment valve to lower the pressure at the air/oil mixture outlet and in the event the numerical value falls below the predetermined acceptable pressure range, adjusting the adjustment valve to raise the pressure at the air/oil mixture outlet, and, sequentially repeating the measuring, converting, displaying and adjusting steps sequentially for each air/oil mixture outlet.

In an embodiment, the adjusting step of the method of the present invention further comprises generating an alarm signal in the event the measured pressure falls above or below the high and low pressure values respectively.

It is therefore an advantage of the present invention to provide an air/oil lubrication system that does not include pressure switches for each individual air/oil mixture outlet or each individual air/oil mixture conduit.

Another advantage of the present invention is that it provides an air/oil mixture lubrication system that does not include individual mixing tees for each bearing point.

Yet another advantage of the present invention is that it provides an air/oil lubrication system with increased air flow to the bearing housings.

Yet another advantage of the present invention is that it provides an air/oil lubrication system that utilizes a pressure transducer to measure and monitor the pressure of the air/oil mixture being delivered to each bearing point which is more accurate than the employment of individual pressure switches.

Still another advantage of the present invention is that it provides an air/oil lubrication system that utilizes a common pressure transducer for all bearing points.

Still another advantage of the present invention is that it provides an air/oil lubrication system that utilizes a common pressure transducer having an analog range that permits the common transducer to monitor both the high and low pressure values of each individual air/oil mixture line.

Yet another advantage of the present invention is that it provides an air/oil lubrication system that utilizes a common pressure transducer that monitors and measures the pressure of the air/oil mixture being delivered to each bearing point in a sequential fashion.

Still another advantage of the present invention is that it provides an improved method for monitoring the pressure of the air/oil mixture being delivered to the plurality of bearing points by an air/oil lubrication system.

Yet another advantage of the present invention is that it provides an improved method for adjusting the pressure of the air/oil mixture being delivered to individual bearing points being lubricated by an air/oil lubrication system.

And another advantage of the present invention is that it provides an improved mixing module for mixing air and oil to generate an air/oil mixture for delivery to large bearings.

And another advantage of the present invention is that it provides an improved mixing module for mixing air and oil for delivery to large bearings.

These and other objects, features and advantages of the present invention will become apparent upon review of the detailed description, appended claims and accompanying drawing figures.

BRIEF DESCRIPTION OF THE DRAWINGS

The invention is illustrated more or less diagrammatically in the accompanying drawings wherein.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Figure 1:
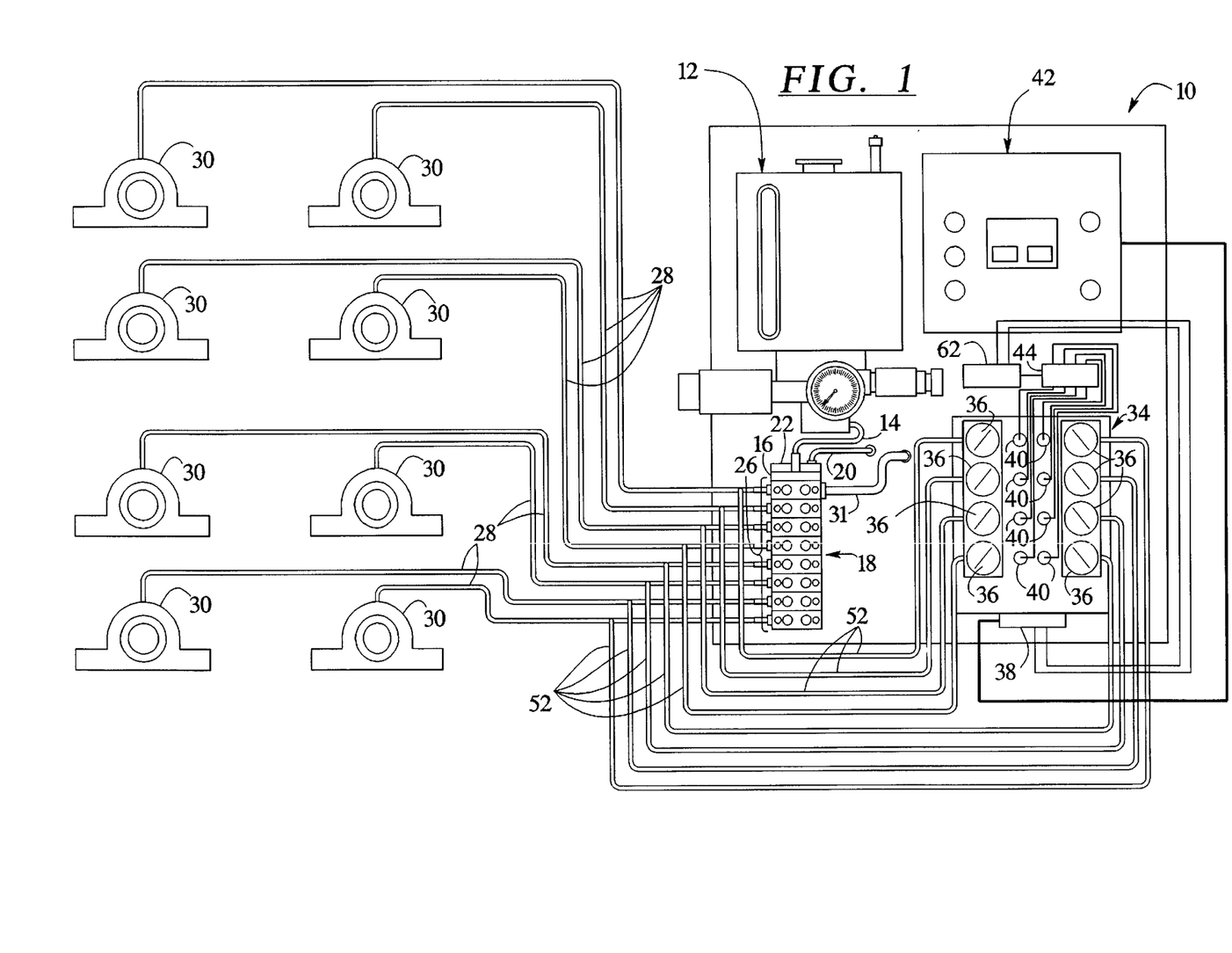
FIG. 1 is a schematic view of an air/oil lubrication system made in accordance with the present invention.

An air/oil lubrication system 10 is illustrated schematically in FIG. 1. Briefly, the system 10, includes a pneumatic pump 12 for providing pressurized oil through the line 14 into an oil inlet 16 of a mixing module 18. Pressurized air is provided through the line 20 to an air inlet 22 of the mixing module 18. The air is mixed with the oil in base section 24 of the module 18 (not shown in FIG. 1, see FIGS. 5 and 6). The details of the base section 14 will be explained in greater detail below with respect to FIGS. 5 and 6. An air/oil mixture departs the mixing module 18 through a plurality of air/oil mixture outlets shown generally at 26. Each air/oil mixture outlet 26 is connected to a connecting line, which are shown generally at 28. Each connecting line 28 provides communication between an air/oil mixture outlet 26 and a bearing housing or bearing point shown generally at 30. A proximity sensor 31 is employed at the mixing module 18 to indicate that oil or lubricant is flowing through the module 18.

It will be noted that the term "air/oil mixture" is used throughout. However, the specific lubricant being applied by the system 10 need not be oil or classified as an oil. The system 10 is capable of mixing air or another suitable gas with any liquid lubricant.

The pressure in the connecting lines 28 or at the outlet ports 26 is monitored by way of the lines shown generally at 32 which, in turn, are connected to a monitoring module 34. The monitoring module 34 includes a plurality of gauges 36 which provide a visual indicia of the pressure in each line 28 or at each air/oil mixture outlet 26.

However, each line 32 is connected to a pressure transducer 38 by way of individual solenoids shown at 40. Thus, a solenoid 40 is disposed between each connecting line 28 or outlet 26 and the transducer 38. When one of the solenoids is "on", communication is established between one of the connecting lines 28 or air/oil mixture outlets 26 and the transducer 38. Because only one pressure transducer 38 is utilized, only one solenoid can be "on" or "open" at a time.

The status of the solenoids is controlled by the controller module 42. Specifically, each solenoid 40 is electrically connected to the connector 44 which, in turn, is connected to the controller module 42. The controller module 42 is also connected to the transducer 38. The controller 42 is programmed with software which will be described below with respect to FIGS. 8–11. The software installed on the controller 42 results in a sequential activation of the solenoids 40 so that communication is established between only one air/oil mixture outlet port 26 and the transducer 38 at a time. The transducer 38 then relays a pressure-indicating analog signal to the processor or controller 42. The controller 42 then converts the analog signal into a digital signal and compares the signal with a preprogrammed acceptable pressure range stored in the memory of the controller 42.

If the pressure in any line 28 or any one of the air/oil mixture outlets 26 is below the acceptable pressure range, the controller 42 will provide an indication or sound an alarm indicating that a line 28 or an outlet 26 is broken and further identifying the specific line 28 or outlet 26. In the event the pressure signal received at the controller 42 exceeds the acceptable pressure range, the controller 42 will provide an indication that one of the lines 28 or outlets 26 is clogged and further provide an indication as to which specific line 28 or outlet 26 is clogged or blocked.

Figure 2:
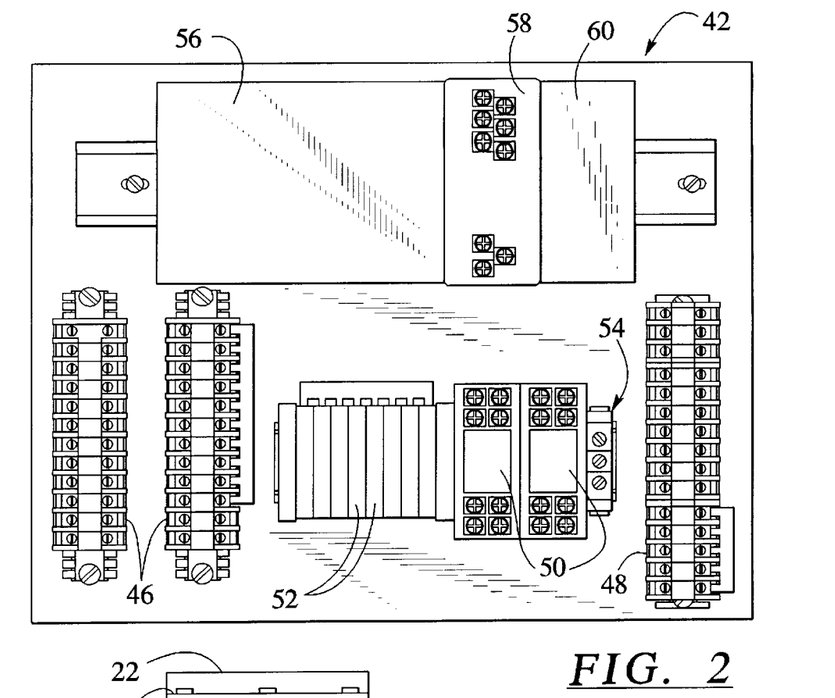
FIG. 2 is a schematic view of a controller module used in the air/oil lubrication system shown in FIG. 1.

FIG. 2 further illustrates a control module 42 which includes a plurality of terminal blocks 46, 48, relays 50, fuse blocks 52, a terminal block 54, a programmable logic controller 56, an analog module 58 and an eight-point input/output module 60. The proximity sensor 31 is also connected to the programmable logic controller 56 and provides an indication to the controller 56 that lubricant is flowing through the module 18.

Figure 3:
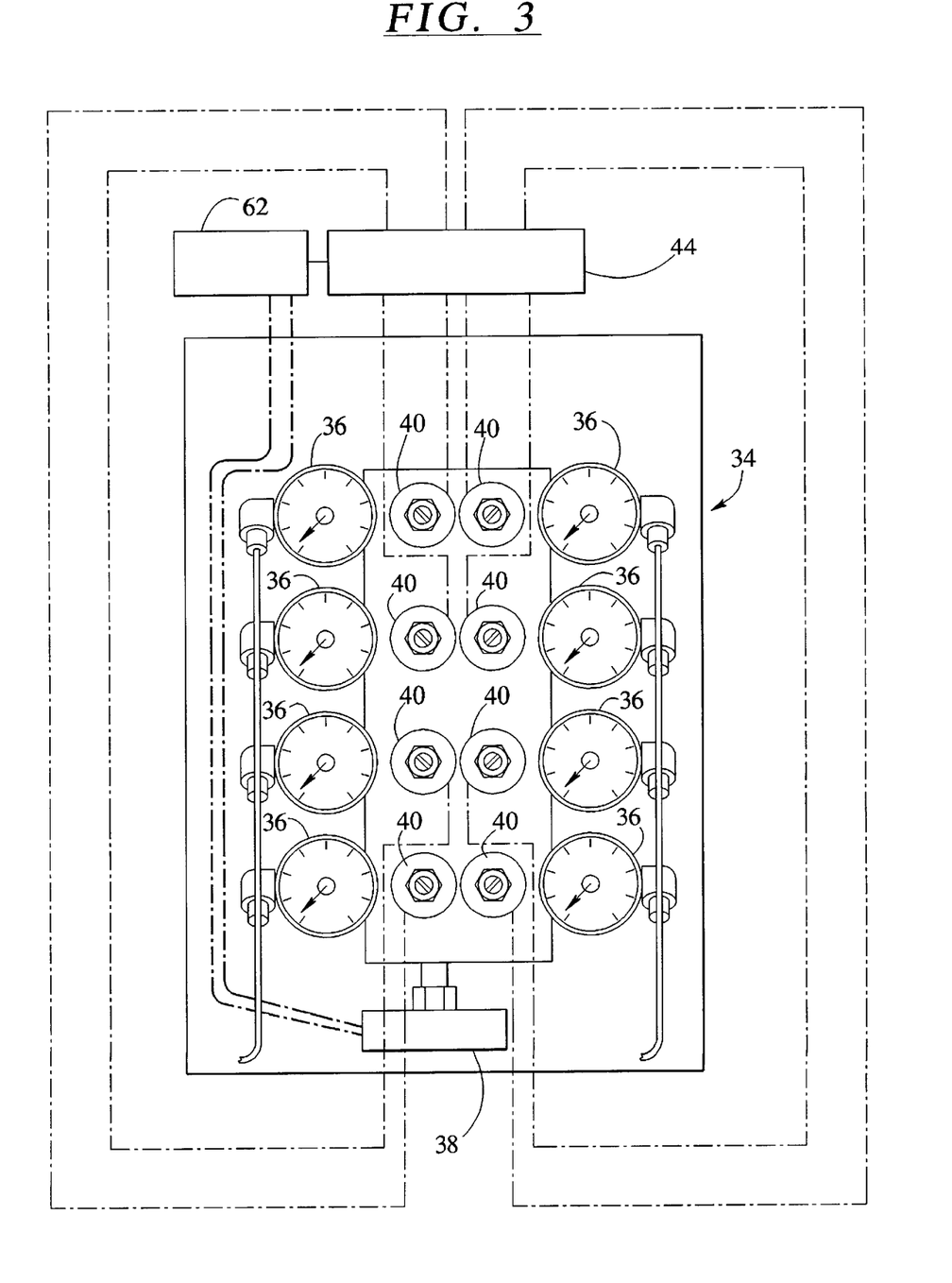
FIG. 3 is a schematic view of a monitoring module used in the air/oil lubrication system shown in FIG. 1.

FIG. 3 is a more detailed illustration of the monitoring module 34 shown in FIG. 1. Each gauge 36 is in communication with one of the connecting lines 28 or air/oil mixture outlets 26 shown in FIG. 1. Each connecting line 28 or air/oil mixture outlet 26 is also connected to a solenoid 40 which, in turn, is connected to the pressure transducer 38. The position of the solenoids 40, either open or closed or on or off, is controlled by the programmable logic controller 56 shown in FIG. 2 by way of the connector 44. The pressure transducer 38 may also be connected to the PLC 56 by way of a connector 62.

Figure 4:
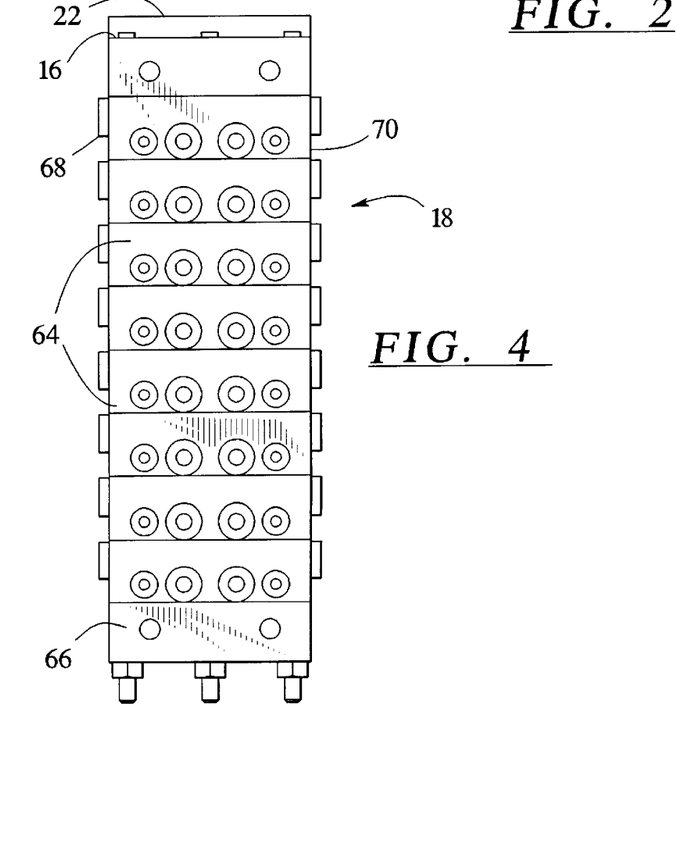
FIG. 4 is a front plan view of a mixing module used in the air/oil lubrication system shown in FIG. 1.
Figure 5:
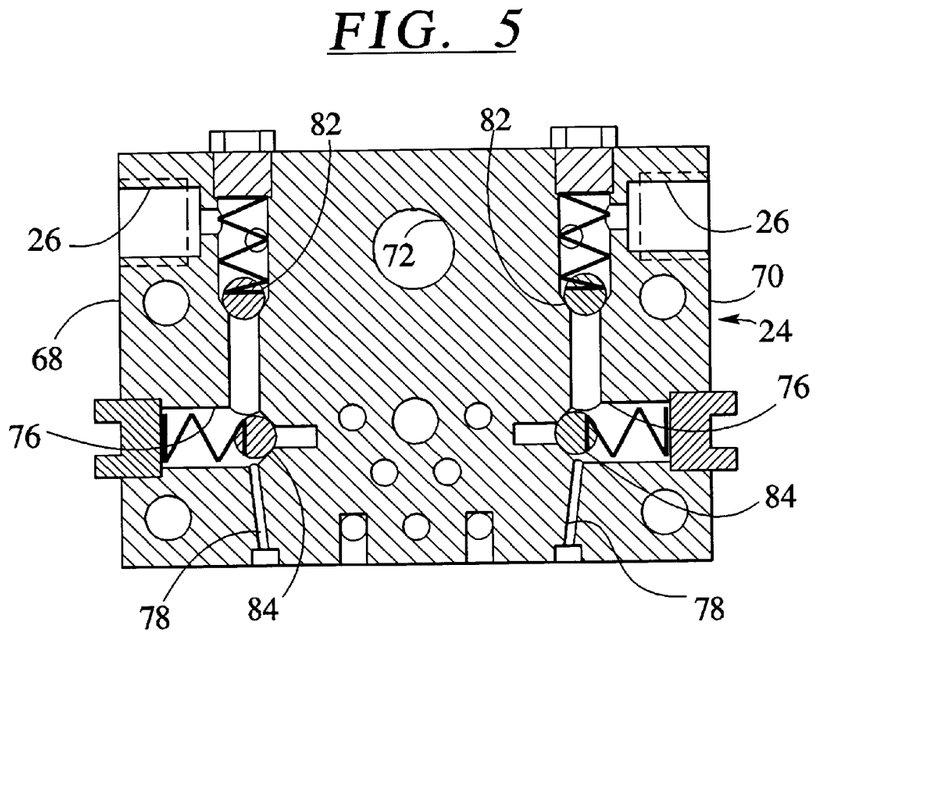
FIG. 5 is a top sectional view of a base section of the mixing module shown in FIG. 4.
Figure 6:
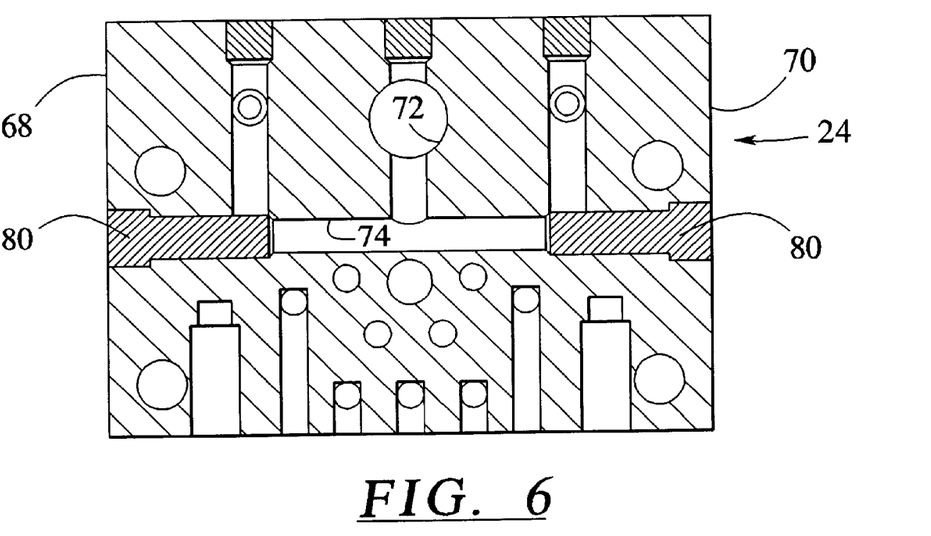
FIG. 6 is another top sectional view of a base section of the mixing module shown in FIG. 4.
Figures 7, 11:
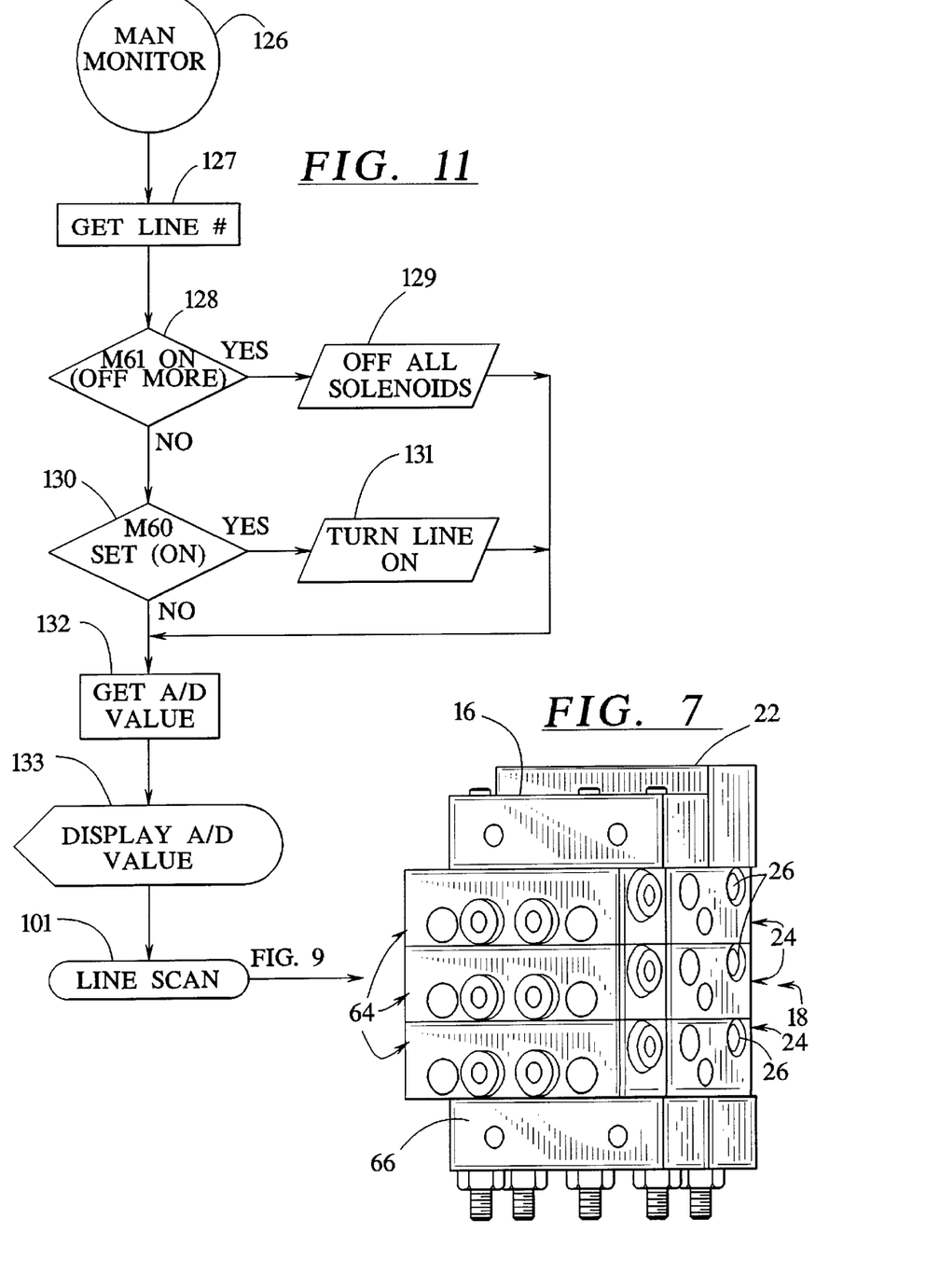
FIG. 7 is a perspective view of a mixing module made in accordance with the present invention.
FIG. 11 is another flow diagram of a portion of the software installed on the controller module first shown in FIG. 1.
Figure 8:
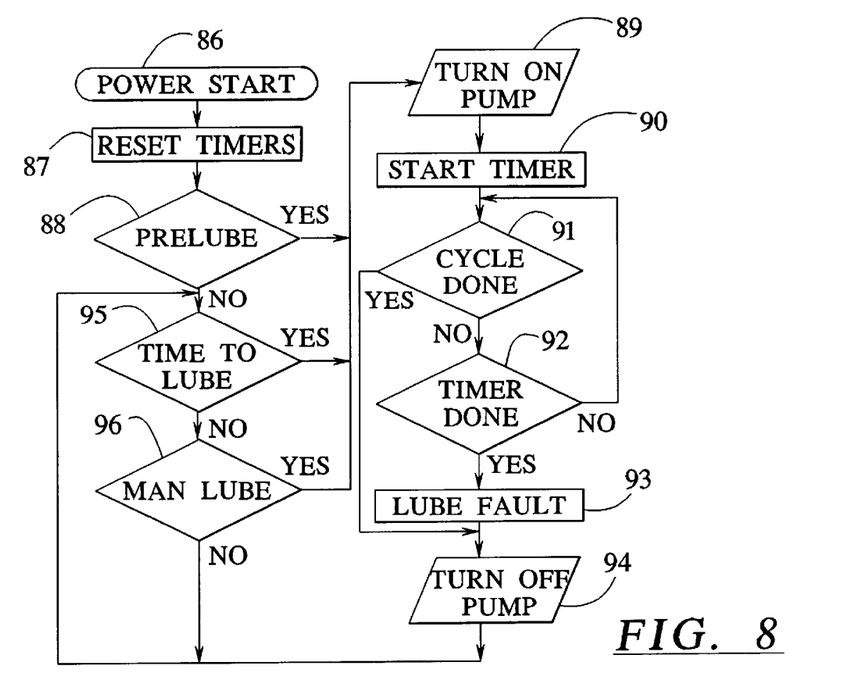
FIG. 8 is a flow diagram of a portion of the software installed on the controller module first shown in FIG. 1.

The mixing module 18 is illustrated in greater detail in FIGS. 4–7. Referring to FIG. 4, the module 18 includes an air inlet 22 and oil inlet 16 mounted on top of a plurality of base sections 24 (see FIGS. 5–7) which are connected at front sides thereof to standard divider valves shown at 64. An outlet section is provided at 66. However, the majority of the air/oil mixture departs the module 18 through air/oil mixture outlet ports 26 disposed at the sides 68, 70 of the base sections 24 as shown in FIGS. 5–7. The divider valves 64 are standard and need not be discussed in detail here.

Turning to FIG. 5, a sectional view of a base section 24 is shown. A common air passageway 72 is in alignment with air passageways of the other base sections 24 of the module 18 so that air can be communicated from the inlet 22 (see FIG. 4) to each base section 24. Air is communicated from the common passageway 72 to a main air passageway 74 of the base section 24 as shown in FIG. 6. From the main passageway 74, the air is communicated into the air/oil mixture passageways shown at 76. Oil or liquid lubricant is supplied to these air/oil mixture passageways 76 by way of the oil passageways shown at 78 which are connected to the divider valve 64. The flow of air into the air/oil mixture passageways 76 is controlled by the adjustment screws 80 shown in FIG. 6.

As discussed below, the adjustment of the screws or valves 80 can be performed while the system 10 is in operation. Specifically, in a preferred embodiment, the control module 42 includes a display which enables the operator to view the pressure at each one of the air/oil mixture outlets 26 while the adjustment to the adjustment screws or valves 80 is being made. The adjustment screws 80 also provide a predeterminable pressure drop from the main air passageway 74 to the air/oil mixture outlets shown at 26 in FIG. 5. By providing the pressure drop from the main air passageway 74, or from the air inlet 22 (see FIG. 4) to the air/oil mixture outlets 26, a significant change in the outlet pressure is experienced when a blocked or broken line condition develops. This change can be easily and accurately detected by the pressure transducer 38. Further, the employment of a pressure transducer 38 makes the adjustment of the screws or valves 80 more accurate and therefore faster. Check valves are provided at 82, 84 to prevent backflow of air or other contaminants into the oil passageways 78.

Turning to FIGS. 8–11, the software used to control the system 10 that is installed on the PLC 56 (see FIG. 2) is explained in greater detail. After the power is initiated at 86, the controller resets all of the timers at 87 which control the operation of the solenoids 40. At 88, the operator is given the option to immediately inject lubricant into the module 18. If this option is selected, the pump is turned on at 89, the timer is started at 90 and the pump is operated until a predetermined amount of lubricant has been injected at 91 and the predetermined cycle time has elapsed at 92. The lube fault is activated at 93 and the pump is turned off at 94.

If the prelube option is not selected at 88, the controller goes into an automated timed sequence of lubrication at 95. If a predetermined time period has elapsed at 95, the pump is activated as shown at 89. If the predetermined period of time has not elapsed at 95, the operator is given the option to manually apply lubricant at 96. Thus, in FIG. 8, there are three ways to apply lubricant through the mixing module 18: the prelube sequence which starts at 88, the timed sequence which starts at 95 and the manual option which starts at 96.

Figure 9:
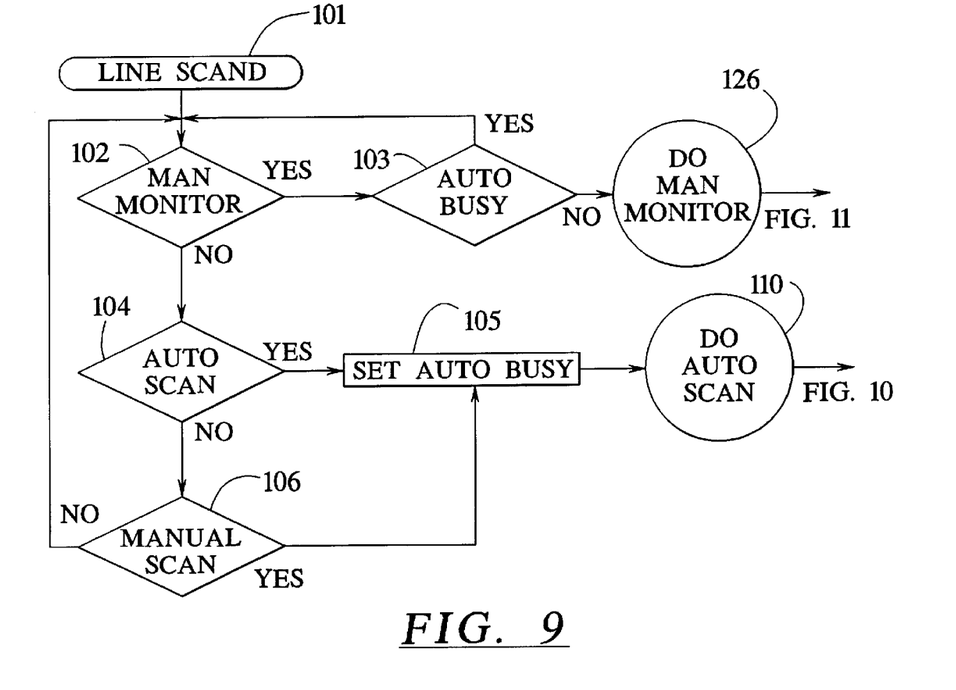
FIG. 9 is another flow diagram of a portion of the software installed on the controller module first shown in FIG. 1.

In addition to the primary function of monitoring and controlling the application of lubricant, the PLC 56 also monitors the lines 28 or outlets 26 and checks the pressure by way of the program illustrated schematically in FIG. 9. The controller 56 scans each line 28 or each outlet 26 at 101. If the manual monitor mode is selected at 102, the controller converts to a manual monitoring program at 103 which is illustrated in greater detail in FIG. 11. If the manual monitoring option is not selected at 102, the controller begins an automatic scan of the lines 28 or outlets 26 at 104 where the system enters into an automated mode at 105 and begins the autoscan function shown in greater detail in FIG. 12. At any time during the operation of the system 10, the manual option may be selected or deactivated at 106.

Figure 10:
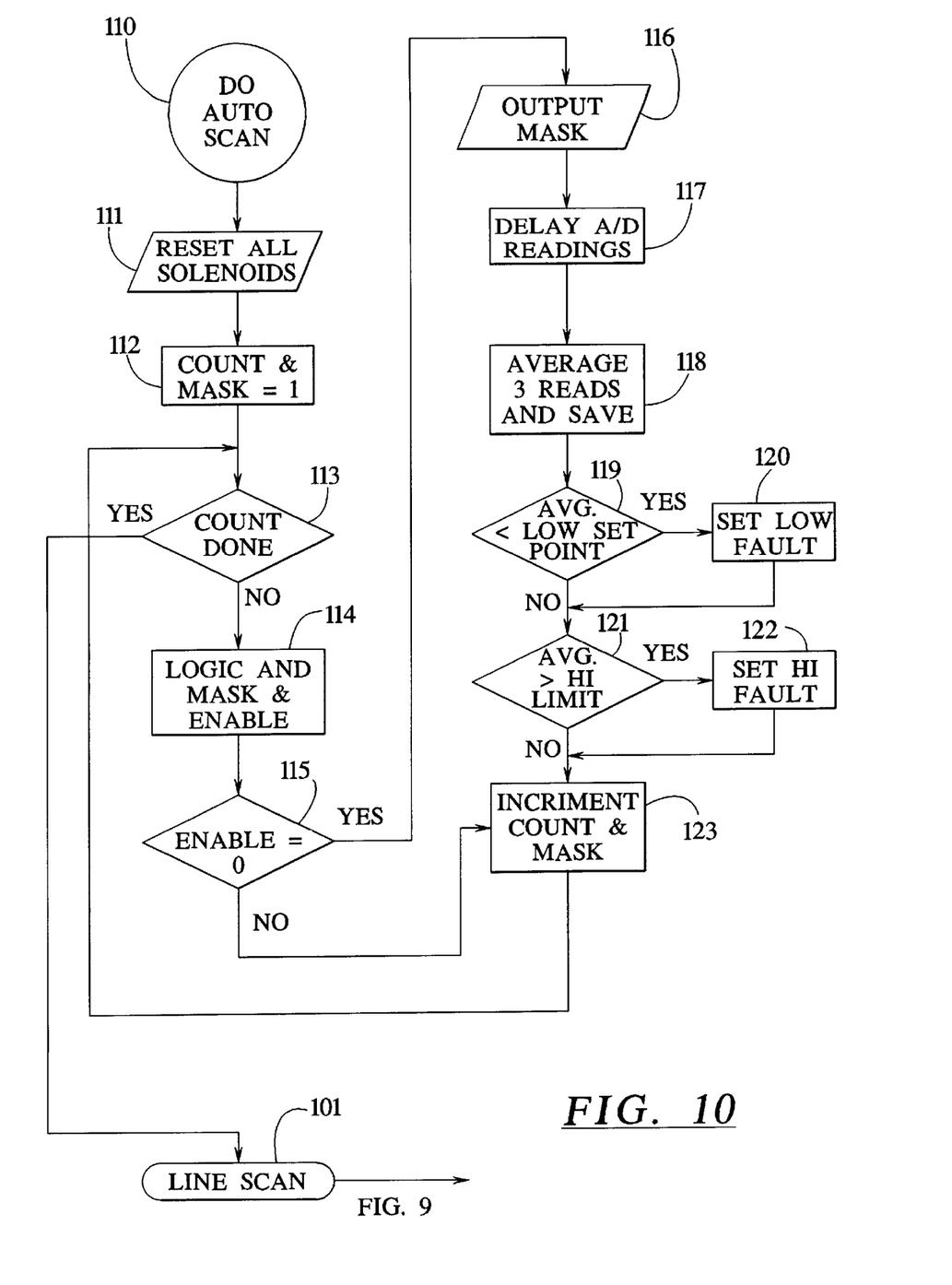
FIG. 10 is another flow diagram of a portion of the software installed on the controller module first shown in FIG. 1.

Turning to FIG. 10, the automatic scanning of the lines 28 or air/mixture outlet ports 26 is illustrated. Specifically, after the autoscan command is received (see FIG. 9) at 110, the PLC 56 resets all of the solenoids at 111 and begins the count at 1 at 112 and checks to see if the count is completed at 113. At 114, the PLC scans one of the lines to be checked and confirms that the process for the particular line is not being repeated at 115. At 116, an output signal is generated and a time delay at 117 is employed to stabilize the generated value. Three measurements are taken at 118 and averaged. If the average value is less than a predetermined low pressure set point at 119, a low fault is set at 120. If the average value generated at 118 is above a predetermined high pressure limit at 121, a high fault is set at 122. The high fault and low faults at 120, 122 respectively can result in the sounding of an alarm or the illumination of a warning light or similar warning system. The system incrementally counts to the next line at 123 and the process is repeated beginning with 113. When the count is completed at 113, the system moves onto the line scan 101 (see FIG. 9).

If the manual monitor option is selected at 102 in FIG. 9 and the auto busy is off at 103, the PLC executes the manual monitor routine 126 shown in FIG. 11. Specifically, a line number has been entered manually and is retrieved at 127. A temporary coil that is controlled by the PLC interface is activated at 128 which turns off all of the solenoids at 129. Another temporary coil is turned on at 130 which activates the specific solenoid for the line 28 or outlet 26 being measured at 131. A value is generated at 132 and displayed at 133. After the manual monitor mode is executed, the system goes back to the line scan 101 (see FIG. 9).

Thus, the system 10 provided by the present invention combines standard divider valve technology with a machine air supply block still further with air flow controls thereby eliminating separate mixing tees, plumbing and the requisite enclosures. The system 10 also minimizes the number of air connections. More importantly, the design of the base section 24 maximizes the air flow capacity to each bearing point 30 which is important to ensure the exclusion or elimination of contaminants at the bearing points. The use of the pressure transducer 38 in an analog fashion provides for a larger range of pressure measurements. By sequentially switching from solenoid 40 to solenoid 40 and using only a single transducer 38, a large number of pressure switches required by the prior art are eliminated. The analog range of the transducer 38 enables it to monitor both the high and low pressure signals which result from blocked line and broken line situations, respectively. The employment of the pressure transducer 38 also eliminates the need for lubrication line orifices because of the sufficient sensitivity of the transducer 38 and the capability of detecting smaller pressure variations than the pressure switches utilized by the prior art. The PLC 56 also enables a digital readout to be presented as the adjustment screws 80 are rotated or adjusted. The software installed on the PLC 56 directs the solenoids to open in the proper sequence for the transducer to sample the lubrication line 28 pressures or the pressures at the outlets 26 and thus detect the operating state of the system 10. The PLC 56 scans the transducer pressure signals and thus compares the pressure at each outlet 26 or line 28 against the predetermined acceptable limits stored in the memory of the PLC 56.

It should be understood that various changes and modifications to the presently preferred embodiments described herein will be apparent to those skilled in the art. Such changes and modifications may be made without departing from the scope and spirit of the present invention and without diminishing its attendant advantages. It is therefore intended that such changes and modifications be covered by the appended claims.

What is claimed is:

1. An air/oil lubrication system for controllably delivering an air/oil mixture to a plurality of bearing points, the system comprising:

a mixing module comprising an air inlet, an oil inlet and a plurality of air/oil mixture outlets, the air inlet and oil outlet being connected to each of the air/oil mixture outlets, each air/oil mixture outlet being connected to one of the plurality of bearing points by one of a plurality of lubrication lines, each air/oil mixture outlet being connected to one of a plurality of solenoids, each solenoid being connected to a common pressure transducer, the common pressure transducer being connected to controller, the controller sequentially opening the solenoids one at a time thereby establishing communication between one of the air/oil mixture outlets and the common transducer at a time, the common transducer receiving pressure signals from each of the air/oil mixture outlets and converting the pressure signals to analog signals before transmitting the analog signals to the controller.

2. The system of claim 1 wherein the controller comprises a memory with predetermined high and low pressure values stored therein, the controller comparing the analog signals received from the transducer with the high and low pressure values, the controller further comprising high and low pressure warning indicia which is activated in the event the controller receives a signal from the transducer that falls outside of an acceptable pressure range defined by the high and low pressure values.

3. The system of claim 1 wherein the controller comprises a memory with a predetermined high pressure value and a predetermined low pressure value stored therein, the controller comparing the signals received from the transducer for each air/oil mixture outlet with the high and low pressure values, the controller further comprising high and low pressure warning indicia which is activated in the event the controller receives a signal from the transducer for any one of the air/oil mixture outlets that falls outside of an acceptable pressure range defined by the high and low pressure values, the high and low pressure warning indicia also identifying which of the air/oil mixture outlets is at a pressure outside of the acceptable pressure range.

4. The system of claim 1 wherein the mixing module further comprises a plurality of base sections arranged in a stacked configuration, each base section comprising an air passageway in communication with the air inlet, each base section comprising an oil passageway in communication with the oil inlet and each base section comprising an air/oil mixture passageway in communication with one of the air/oil mixture outlets,     each base section further comprising an adjustable valve disposed between the air passageway and the air/oil mixture passageway of said base section for controlling the flow of air into the air/oil mixture passageway of said base section.

5. The system of claim 4 wherein the adjustable valves each comprise an adjustment screw with a head disposed on an exposed surface of its respective base section thereby enabling the adjustment screw to be rotated by hand while the system is operating.

6. The system of claim 5 wherein the controller further comprises a digital readout for indicating the pressure of the air/oil mixture outlet in communication with the transducer.

7. A method for monitoring the pressure in an air/oil lubrication system comprising the following steps:
   a) supplying pressurized air to an air inlet;
   b) suppling pressurized oil to an oil inlet;
   c) mixing the air and oil in a plurality of base sections that each include an air/oil mixture outlet in communication with one of a plurality of bearing points;
   d) measuring a pressure at one of the air/oil mixture outlets with a common transducer and generating a measured pressure signal;
   e) comparing the measured pressure signal for said one of the air/oil mixture outlets with predetermined acceptable high and low pressure values;
   f) in the event the measured pressure value for the air/oil mixture outlet being measured exceeds the high pressure value or falls below the low pressure value, generating an alarm signal;
   g) sequentially repeating steps d through f for each air/oil mixture outlet.

8. The method of claim 7 wherein step f further comprises identifying the air/oil mixture outlet in the event the measured pressure is above the high pressure valve or lower than the low pressure valve.

9. A method for adjusting the pressure of an air/oil mixture being supplied to a plurality of bearing points of an air/oil lubrication system, the method comprising the following steps:

a) supplying pressurized air to an air inlet;
b) suppling pressurized oil to an oil inlet;
c) mixing the air and oil in a plurality of base sections, each base section comprising an air passageway in communication with the air inlet, each base section comprising an oil passageway in communication with the oil inlet and each base section comprising an air/oil mixture passageway in communication with an air/oil mixture outlet, each base section further comprising an adjustable valve disposed between the air passageway and the air/oil mixture passageway of said base section for controlling the flow of air into the air/oil mixture passageway of said base section;
d) measuring a pressure at one of the air/oil mixture outlets with a common transducer and generating a measured pressure signal;
e) converting the measured pressure signal to a numerical value;
f) displaying the numerical value;
g) in the event the numerical value falls above a predetermined acceptable pressure range, adjusting the adjustment valve to lower the pressure at the air/oil mixture outlet and in the event the numerical value falls below the predetermined acceptable pressure range, adjusting the adjustment valve to raise the pressure at the air/oil mixture outlet;
h) sequentially repeating steps d though g for each for each air/oil mixture outlet.

10. The system of claim 9 wherein step g further comprises in the event the numerical exceeds the high pressure value or falls below the low pressure value, generating an alarm signal.

11. A mixing module for an air/oil lubrication system, the mixing module comprising:
    a plurality of base sections arranged in a stacked configuration, each base section comprising an air passageway in communication with an air inlet, each base section comprising an oil passageway in communication with oil inlet and each base section comprising an air/oil mixture passageway in communication with one of the air/oil mixture outlets,
    each base section further comprising an adjustable valve disposed between the air passageway and the air/oil mixture passageway of said base section for controlling the flow of air into the air/oil mixture passageway of said base section.

12. The module of claim 11 wherein the adjustable valves each comprise an adjustment screw with a head disposed on an exposed surface of its respective base section thereby enabling the adjustment screw to be rotated by hand while the system is operating.

* * * * *